US011745498B2

(12) United States Patent
Aarts

(10) Patent No.: US 11,745,498 B2
(45) Date of Patent: Sep. 5, 2023

(54) METHOD OF CONTROLLING A DIGITAL PRINTER WITH FAILURE COMPENSATION

(71) Applicant: Canon Production Printing Holding B.V., Venlo (NL)

(72) Inventor: Peter J. M. Aarts, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 133 days.

(21) Appl. No.: 17/525,168

(22) Filed: Nov. 12, 2021

(65) Prior Publication Data

US 2022/0161550 A1 May 26, 2022

(30) Foreign Application Priority Data

Nov. 25, 2020 (EP) .................................... 20209883

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC ...... B41J 11/008; B41J 2/2132; B41J 29/393; B41J 13/0009; B41J 11/0065; B41J 29/38; B41J 2/04505; B41J 2/04588; B41J 2/04558; B41J 2/04586; B41J 2/2139; B41J 2/0451; B41J 2/04551; B41J 2/2142; B41J 2/04508; B41J 2/16579

See application file for complete search history.

(56) References Cited

U.S. PATENT DOCUMENTS

| | | | |
|---|---|---|---|
| 6,460,963 B1 | 10/2002 | Endo | |
| 7,104,626 B2 | 9/2006 | Oyen | |
| 2012/0050378 A1* | 3/2012 | Kido | B41J 2/2139 347/19 |
| 2016/0144613 A1 | 5/2016 | Fukazawa et al. | |
| 2017/0297334 A1* | 10/2017 | De Meutter | B41J 2/14 |

OTHER PUBLICATIONS

European Search Report, issued in Application No. 20 20 9883, dated Apr. 22, 2021.

* cited by examiner

*Primary Examiner* — Jannelle M Lebron
(74) *Attorney, Agent, or Firm* — Birch, Stewart, Kolasch & Birch, LLP

(57) ABSTRACT

A digital printer and a method of controlling the digital printer having a print head with an array of printing elements and a failure detection system arranged to detect malfunctioning printing elements. When, during printing, a malfunctioning printing element is detected, a switch from the current print strategy to another print strategy is arranged during printing which leaves the number of passes per swatch constant, i.e. the print quality is not affected by the switch.

11 Claims, 5 Drawing Sheets

METHOD OF CONTROLLING A DIGITAL PRINTER WITH FAILURE COMPENSATION

FIELD OF THE INVENTION

The present invention relates to a method of controlling a digital printer having a print head with an array of printing elements, the print head being arranged to scan a recording medium in a main scanning direction, and the print head and the recording medium being arranged to be moved relative to one another in a sub-scanning direction normal to the main scanning direction in predetermined steps of relatively advancing the recording medium between passes of scanning the recording medium in the main scanning direction, the printer being arranged to operate in a selected first print strategy which is characterized by a first pattern of a constant number of scan passes per area unit of the recording medium in which scan passes the array of printing elements moves over the recording medium in the main scanning direction resulting in print swaths on the recording medium, and a constant number of advance steps in the sub-scanning direction, wherein for each of the advance steps a moving distance is prescribed, and the printer comprising a print condition detection system arranged to detect a change of at least one print condition for printing by the digital printer.

Hereinafter the wordings "printing element" and "nozzle" may be interchangeably used.

BACKGROUND OF THE INVENTION

It is known from U.S. Pat. No. 7,104,626 to adapt nozzle failure compensation and a print mode to the type of image before a start of printing the image, i.e. at the beginning of a print job.

Examples of print strategies of a 4-pass mode according to the art are shown in FIG. 2 and FIG. 3.

It is an object of the present invention to provide a method which permits to compensate a print condition change and to achieve a same quality of the printed image before the print condition change and at the same time to achieve a highest possible productivity of the print process.

SUMMARY OF THE INVENTION

In order to achieve this object, the method according to the present invention comprises steps of:
a) starting of moving the print head according to the first print strategy;
b) during printing receiving a trigger from the print condition detection system that a print condition has changed during printing,
c) determining if an adaptation of the first print strategy is needed due to the changed print condition,
d) upon a positive determination in the previous step c),
d1) finishing the current scan pass in the main scanning direction,
d2) selecting a second print strategy in which the changed printing condition is taken care of, the second print strategy comprising at least one other moving distance for an advance step in the sub-scanning direction than the first print strategy,
d3) selecting a boundary line on the recording medium until which the first print strategy is applied and after which the second print strategy is applied, the boundary line being determined to be a line on the recording medium below a print swath created by the current scan pass finished in step d1), and
d4) in next scan passes printing elements of the print head positioned above the boundary line printing according to the first print strategy and printing elements of the print head below the boundary line printing according to the second print strategy.

The printer is able to detect print condition changes. Based on the kind of print condition change a best print strategy is selected that offers the highest print speed while maintain proper print quality. To maintain the print quality a number of print passes per unit area of the recording medium will be unchanged. For example, if the image to be printed was started printing in a 4-pass print mode in the first print strategy, the printer will continue to print in a 4-pass mode in the second print strategy.

According to an embodiment the method comprises the step of selecting the boundary line above a next interweave area of the recording medium in which next interweave area successive print swaths overlap or touch each other in order to create a continuous print.

According to an embodiment the method comprises the step of adapting a distance of a step in the sub-scanning direction in order to position the print head such that a switch from the first print strategy to the second print strategy is possible.

According to an embodiment the distance of the step is smaller than a largest step in the sub-scanning direction according to the second print strategy.

According to an embodiment the print condition detection system is a failure detection system arranged to detect malfunctioning printing elements during printing, and the method comprises the steps of receiving the trigger from the failure detection system that a printing element has started malfunctioning during printing and that the malfunctioning printing element is aligned with another malfunctioning printing element in one of the subsequent scan passes in the main scanning direction, and step d2) comprises the sub-step of selecting the second print strategy in which the malfunctioning printing element is not aligned with the other malfunctioning printing element.

According to an embodiment the method comprises the steps of receiving the trigger from the failure detection system that a malfunctioning printing element has started functioning again, and step d2) comprises the sub-step of selecting the second print strategy to be the print strategy which was in place before receiving the trigger of the malfunctioning printing element.

According to an embodiment the print condition detection system comprises at least one sensor out of a temperature sensor, a pressure sensor and an air humidity sensor, and the method comprises the step of receiving the trigger from the print condition detection system that environmental conditions of the printer are changed which have an impact on the print quality of a printed end product.

According to an embodiment the method comprises the step of receiving the trigger from the print condition detection system of a drift of the recording medium during printing or of a shrinkage of the recording medium.

The present invention also relates to a digital printer having a print head with an array of printing elements, the print head being arranged to scan a recording medium in a main scanning direction, and the print head and the recording medium being arranged to be moved relative to one another in a sub-scanning direction normal to the main scanning direction in predetermined steps of relatively advancing the recording medium between passes of scanning the recording medium in the main scanning direction, the printer being arranged to operate in a selected print strategy which is characterized by a first pattern of a constant number of scan passes per area unit of the recording medium in which scan passes the array of printing elements moves over the recording medium in the main scanning direction resulting in print swaths on the recording medium, and a constant number of advance steps in the sub-scanning direction, wherein for each of the advance steps a moving distance is prescribed, the digital printer further having an electronic processing unit arranged to control the movements of the print head and the recording medium as well as the operation of the printing elements, the processing system including a print condition detection system arranged to a change of at least one print condition for printing by the digital printer, characterized in that the processing unit is configured to control the printer in accordance with the method according to the invention.

According to an embodiment of the digital printer, the print condition detection system is a failure detection system arranged to detect malfunctioning printing elements, characterized in that the processing unit is configured to control the printer in accordance with the method according to the invention.

The present invention also relates to a non-transitory software product comprising program code on a machine-readable medium, which program code, when loaded into an electronic processing unit of a digital printer, causes the processing unit to control the printer in accordance with the method according to the invention.

DETAILED DESCRIPTION OF THE EMBODIMENTS

Embodiment examples will now be described in conjunction with the drawings, wherein.

Figure 1:
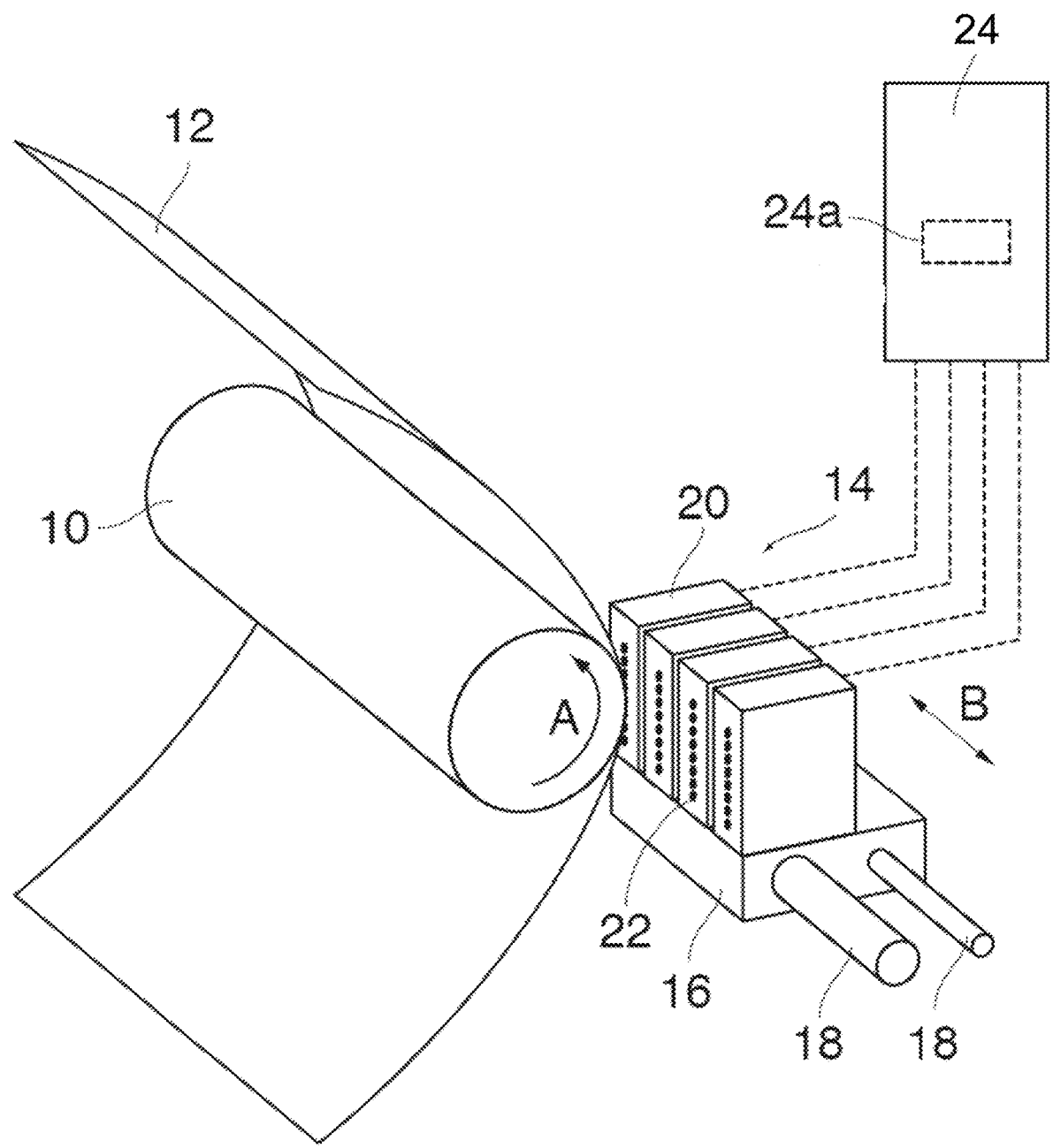
FIG. 1 is a schematic perspective view of an ink jet print head to which the invention is applicable.

As is shown in FIG. 1, an ink jet printer comprises a platen 10 which serves for transporting a recording medium (paper) 12 in a sub-scanning direction (arrow A) past a print head unit 14. The print head unit 14 is mounted on a carriage 16 that is guided on guide rails 18 and is movable back and forth in a main scanning direction (arrow B) relative to the recording medium 12. In the example shown, the print head unit 14 comprises four print heads 20, one for each of the basic colors cyan, magenta, yellow and black. Each print head has a linear array of nozzles 22 (printing elements) extending in the sub-scanning direction. The nozzles 22 of the print heads 20 can be energized individually to eject ink droplets onto the recording medium 12, thereby to print a pixel on the paper. When the carriage 16 is moved in the direction B across the width of the recording medium 12, a swath of an image can be printed. The number of pixel rows of the swath corresponds to the number of nozzles 22 of each print head. When, in a single-pass print mode, the carriage 16 has completed one path, the recording medium 12 is advanced by the width of the swath, so that the next swath can be printed. In a multi-pass print mode, the feed distance of the recording medium will be smaller than the width of the swath, and the pixels and pixel rows printed in different passes may be interleaved.

The print heads 20 are controlled by a processing unit 24 which processes the print data and generates control signals for controlling the printing elements in the print heads 20 as is well known in the art. The processing unit 24 comprises a print condition detection system 24a for detecting a print condition change during printing.

In a preferred embodiment the print condition detection system 24a is a failure detection system for detecting nozzle failures.

Figure 2:
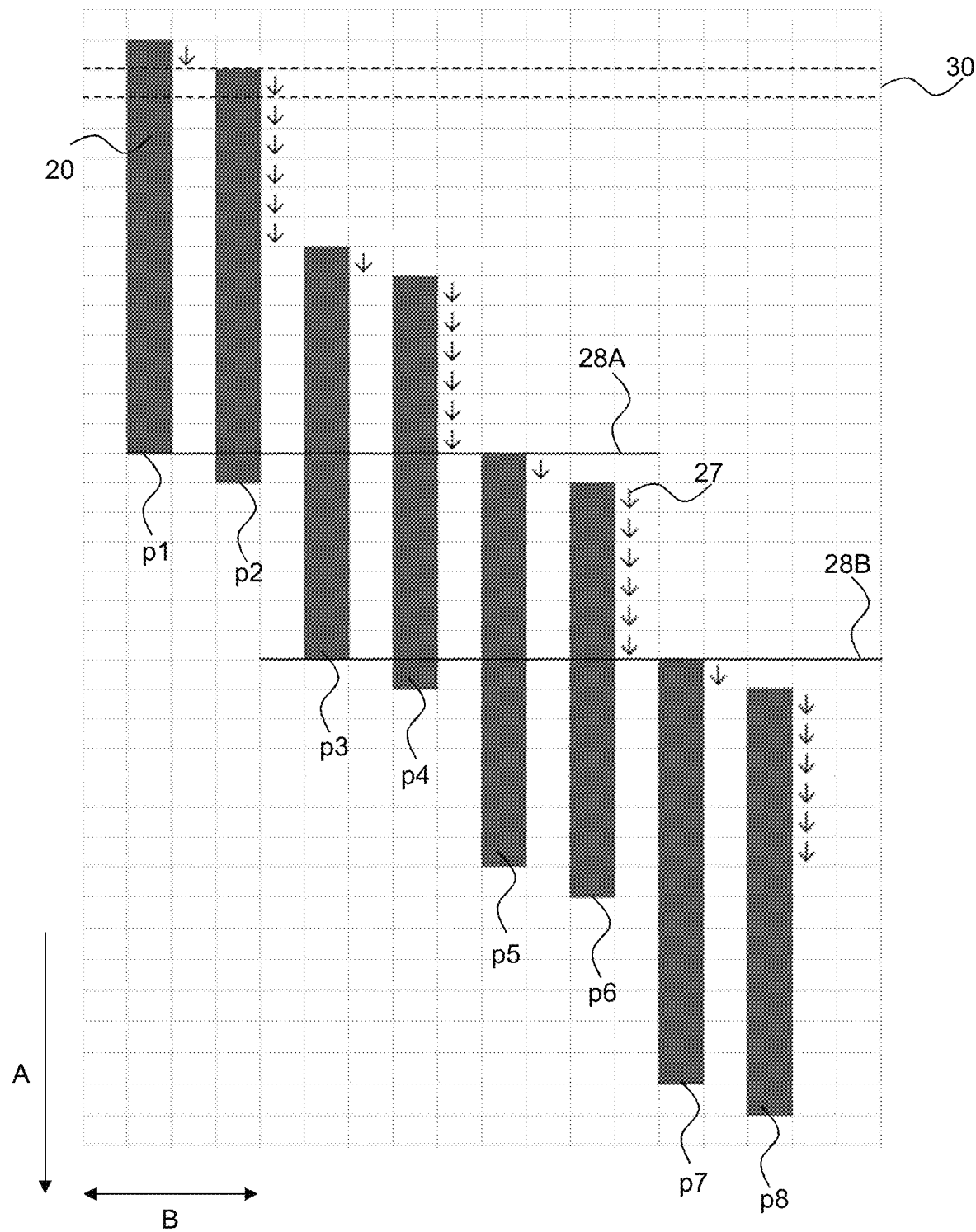
FIGS. 2-3 are examples of print strategies according to the prior art.
Figure 3:
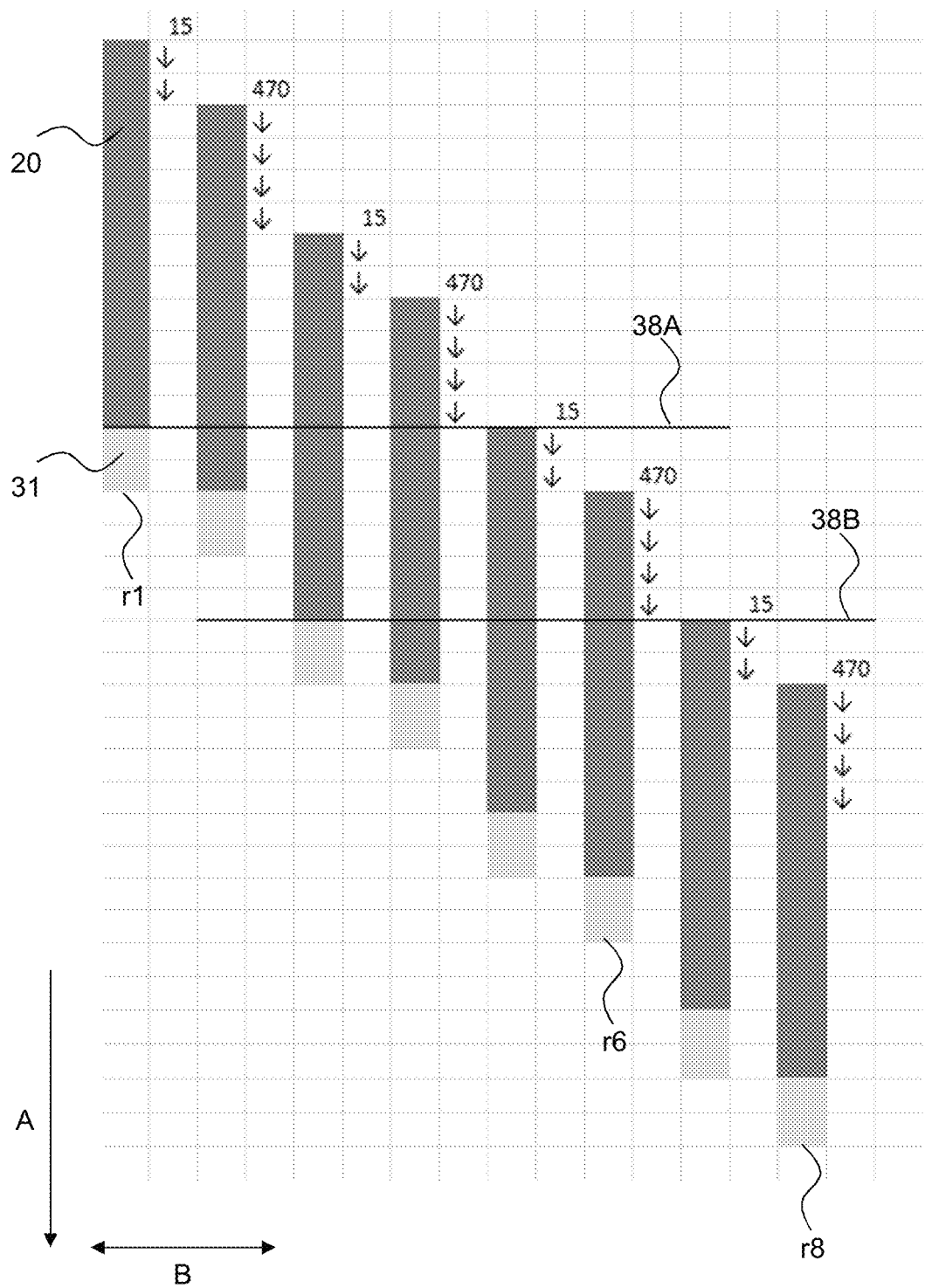

FIG. 2 and FIG. 3 show different print strategies for a multi-pass print mode according to prior art, i.e. in this example a 4-pass print mode. The discussion will be focused on printing in a single color, but is equivalently valid for printing in multiple colors.

FIG. 2 shows a simplified example of the first print strategy according to the prior art. For convenience purposes a print head 20 is shown with a linear array of (only) fourteen nozzles. Under the control of the processing unit 24, the nozzles are fired periodically in order to print an image consisting of a solid image area composed of parallel pixel lines 30. Each pixel row 30 is composed of ink dots which are printed in all pixel positions, so that the dots in each row are placed directly adjacent to one another, and the individual pixel rows 30 are also directly adjacent to one another (at least in the respective parts on the recording medium 12 where the print process is completed), so that the image area has a maximum dot coverage (of 100%).

FIG. 2 shows a number of eight scan passes p1-p8 in which the print head 20 moves from left to right and/or from right to left in the main scanning direction (as indicated by a double sided arrow B). Between the scan passes in the main scanning direction B, the print head also moves in the sub-scanning direction (as indicated by the single sided arrow A). The steps of the print head in the sub-scanning direction A are indicated by small downward directed arrows 27. For convenience reasons the distance of each step 27 in the sub-scanning direction A is set equal to the pitch between the nozzles of the print head 20 in the sub-scanning direction A. In practice the step of the print head 20 relative to the recording medium 12 is much larger than the pitch between the nozzles, i.e. the step is equal to a manifold of the pitch between the nozzles.

A scan pass p1 illustrated in FIG. 2 may be designated as the "first pass", although some of the pixel rows 30 in the top part of the image have been printed already in earlier cycles of the print process. FIG. 2 shows a 4-pass print mode. After every scan pass, a swath is completed on the recording medium 12. For example, after the sixth scan pass p6 a swath is completed which is situated between the lines 28A and 28B. The swath width is equal to a seven steps distance in the sub-scanning direction A. The shown first print strategy is characterized by a first pattern of a constant number of four scan passes per area unit of the recording medium 12 in which scan passes the array 20 of printing elements moves over the recording medium 12 in the main scanning direction B resulting in print swaths p1-p8 on the recording medium 12, and a constant number of 4 advance steps in the sub-scanning direction A, wherein for each of the advance steps a moving distance is prescribed. The moving distances of the advance steps described for the first print strategy shown in FIG. 2 are respectively 1, 6, 1 and 6 steps. The distances of the moving steps may be chosen in such a way that the print quality of the image on the recording medium 12 is assured.

The process unit 24 of the printer may be configured in such a way that the scan passes p1, p3, p5, p7 are directed from left to right in the main scanning direction B, while the scan passes p2, p4, p6, p8 are directed from right to left in the main scanning direction B, but other configurations of the process unit 24 may be envisioned which lead to other scan directions for the scan passes p1-p8. The scan passes p1-p8 may also be applied according to an interweave pattern wherein in a subsequent scan pass a part of the nozzles are filling gaps between pixel rows that have been printed in a previous scan pass.

A swath (consisting of seven pixel rows in this example) of a solid image area is completed as soon as the print head 20 has moved over that swath in four successive passes which constitute one print cycle.

Of course, when the printer has a print head with two parallel rows of nozzles for each color, it is possible that, even in this highest-quality print mode, a nozzle failure in one row can be compensated by activating a nozzle in the other row, provided of course that the nozzle that is needed for the compensation does not fail itself. Similarly, it is possible that a nozzle failure in a print head for one color is compensated by printing an extra dot in another color.

FIG. 3 shows a simplified example of the second print strategy according to the prior art. The print head 20 is shown with a linear array of (only) fourteen nozzles of which twelve nozzles are actually used in printing the swaths. The not used nozzles 31 are grey-shaded. A number of eight scan passes r1-r8 are shown in which the print head 20 moves from left to right and/or from right to left in the main scanning direction (as indicated by a double sided arrow B). FIG. 3 also shows a 4-pass print mode. After every scan pass, a swath is completed on the recording medium 12. For example, after the sixth scan pass r6 a swath is completed which is situated between the lines 38A and 38B. The swath width is equal to a six steps distance in the sub-scanning direction A.

The second print strategy is characterized by a second pattern of a constant number of four scan passes per area unit of the recording medium 12 in which scan passes the array 20 of printing elements moves over the recording medium 12 in the main scanning direction B resulting in print swaths r1-r8 on the recording medium 12, and a constant number of 4 advance steps in the sub-scanning direction A, wherein for each of the advance steps a moving distance is prescribed. The moving distances of the advance steps described for the second print strategy shown in FIG. 3 are respectively 2, 4, 2 and 4 steps. The distances of the moving steps may be chosen in such a way that the print quality of the image on the recording medium 12 is assured.

Figure 4:
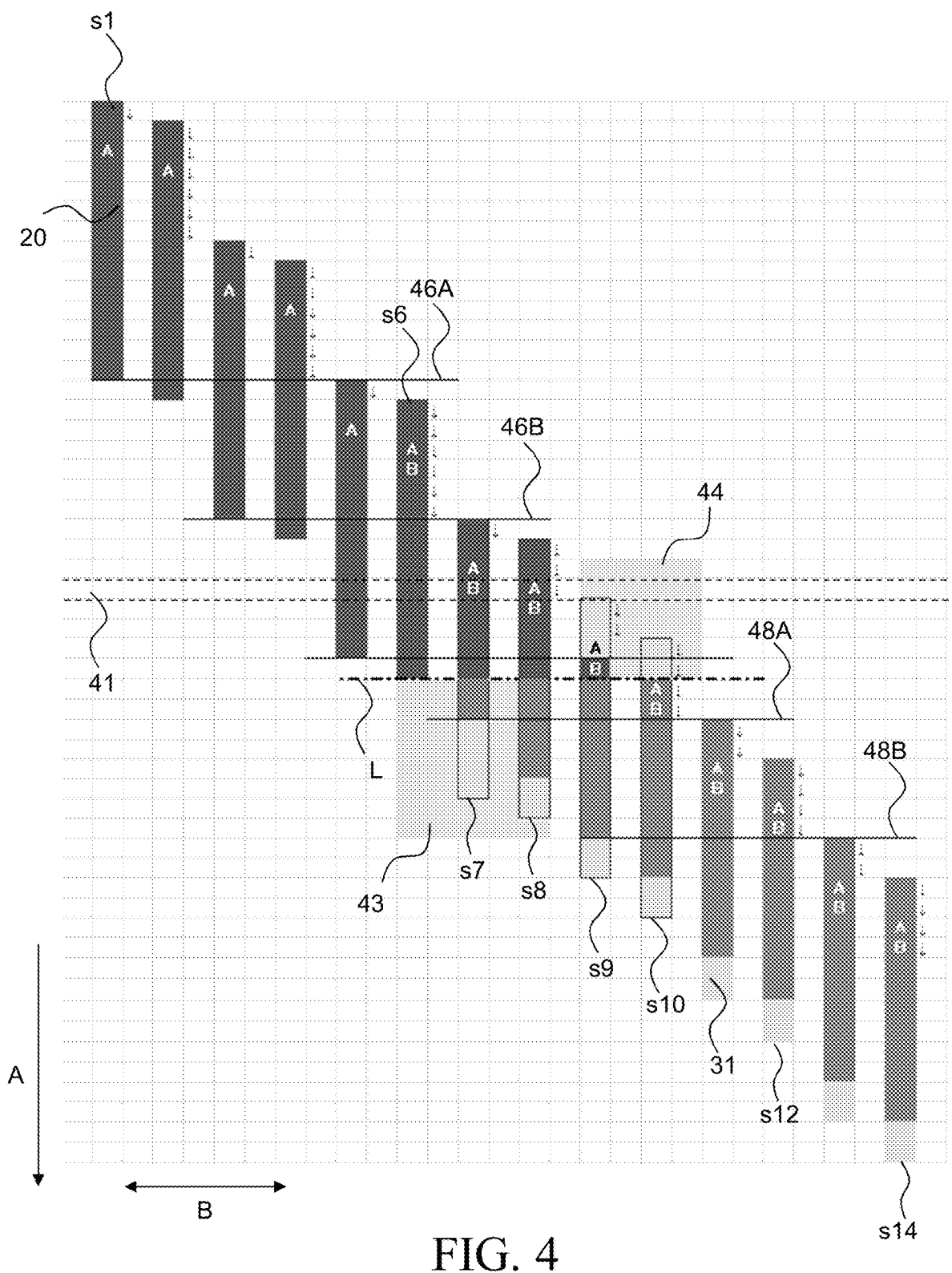
FIG. 4 is a diagram illustrating the switch from the first print strategy to the second print strategy during printing according to the invention.

FIG. 4 illustrates a switch of print strategies during printing from the first print strategy shown in FIG. 2 to the second print strategy shown in FIG. 3.

The print head 20 is again shown with a linear array of (only) fourteen nozzles of which fourteen nozzles are used in printing the swaths according to the first print strategy and twelve nozzles are used in printing the swaths according to the second print strategy. The not used nozzles 31 are grey-shaded. A number of fourteen scan passes s1-s14 are shown in which the print head 20 moves from left to right and/or from right to left in the main scanning direction (as indicated by a double sided arrow B). FIG. 4 also shows a 4-pass print mode. After every scan pass, a swath is completed on the recording medium 12. For example, after the sixth scan pass s6 a swath is completed which is situated between the lines 46A and 46B. The swath width is equal to a seven steps distance in the sub-scanning direction A according to the first print strategy. The moving distances of the advance steps according to the first print strategy are respectively 1, 6, 1 and 6 steps. The moving distances of the advance steps according to the second print strategy are respectively 2, 4, 2 and 4 steps.

After each swath a current status of the print conditions is retrieved from the print condition detection system 24a. In a preferred embodiment, the print condition detection system 24a is a failure detection system for detecting failing nozzles of the print head 20 which is in use in the case presented in FIG. 4.

From the beginning of the passes s1-s14 there is present a first failing nozzle A which has been detected by the failure detection system 24a before the first pass s1. During the sixth pass s6 a second failing nozzle B is detected by the failure detection system. As can be seen in the pixel row 41 the failing nozzles B and A are going to be aligned in the passes s7 and s8 and also in subsequent passes if there would be no change of print strategy. This alignment will lead to a quality decrease of the image to be printed. Therefore the detection of the second failing nozzle B during the sixth pass s6 is a trigger to change the print strategy during runtime according to the present invention. The second print strategy shown in FIG. 3 is selected to replace the first print strategy. When applying the second print strategy the nozzles A and B are not aligned anymore which is illustrated in the passes s9-s14.

In this example a boundary between the first print strategy and the second print strategy is indicated by the line L. The boundary is selected to be a line below the swath at which the second failing nozzle B is detected, i.e. during the sixth pass s6. In order to make the method steps less complicated, it is preferred to select the boundary L above a next interweave area in which successive swaths just overlap or touch to create a continuous print. However, the method according to the invention also works when the boundary is selected to be positioned within the interweave area.

A media step (6 advance steps) between the sixth pass s6 and seventh pass s7 and a media step (1 advance step) between the seventh pass s7 and the eighth pass s8 are still according to the first print strategy. Starting during the seventh pass s7, the nozzles of the print head 20 which are positioned above the boundary line L keep printing according to the first print strategy, whereas the nozzles of the print head 20 which are positioned below the boundary line L start printing according to the second print strategy.

A media step (in this example 3 advance steps) between the eighth pass s8 and the ninth pass s9 is an adaptation step that positions the carriage such that a switch can be made from the first print strategy to the second print strategy. The adaptation step is needed to get the bottom of the carriage in proper position to make the switch from the first print strategy to the second print strategy in case of an alignment of failing nozzles. Such an adaptation step is typically smaller than the largest step (4 advance steps) of the second print strategy to avoid complexity at the top of a new swath.

It is noted that when the trigger to switch from a first print strategy to a second print strategy is another one then the detection of a failing nozzle or the detection of a nozzle which is functioning again, then it may be possible to avoid the adaptation step. Such a trigger may be for example a trigger from a temperature sensor, a pressure sensor and/or an air humidity sensor of a temperature change, a pressure change and/or an air humidity change respectively, having an impact on the print quality of an end product.

A nozzle of the print head In the light-green shaded area 43 is printing data according to the second print strategy, but by means of another nozzle number than in the second print strategy. A nozzle of the print head in the light-green shaded area 44 is printing data according to the first print strategy, but by means of another nozzle number than in the first print strategy.

In the ninth step s9 and in the tenth pass s10 the nozzles that are positioned above the boundary line L keep printing according to the first print strategy, whereas the nozzles that are positioned below the boundary line L start printing according to the second print strategy. In the eleventh pass s11 and further passes s12-s14 the media steps follow the second print strategy.

In other words, as long as the carriage has not fully passed the boundary line L, the nozzles that re positioned above the boundary line L keep printing according to the first print strategy, whereas the nozzles that are positioned below the boundary line L start printing according to the second print strategy. Once the carriage has fully passed the boundary line L, the switch from the first print strategy to the second print strategy is completed.

By using the method according to the invention switching between the print strategies is possible at runtime, using a hard split (i.e. boundary line L) between the areas of strategy before and after the switch. Given that a number of passes per swath (in this example a 4-pass mode is involved) is identical before and after the switch, the switch between the strategies is not reflected in print quality, other than due to the absence of interactions between failing nozzles A, B. Since the first and second strategy produce equivalent print quality due to the same number of passes per swath, both print strategies look the same in normal situations. Therefore the switch between the first and second print strategy is hardly or not noticeable in the end product.

The average number of steps in during a switch of print strategies may be the same but may also deviate from each other. In the example of FIG. 4 the average number of steps in the first print strategy is (1+6)/2=3.5, while the average number of steps in the second print strategy is (2+4)/2=3. The patterns of media steps, i.e. the media step sizes, in the first and second print strategy are not mandatory and may be chosen in another way in order to avoid alignment of failing nozzles in subsequent passes. The selection of the second print strategy is dependent on which nozzle (B in FIG. 4) is failing, i.e. the selection of the second print strategy is dependent on print condition information that becomes available only during printing and not before printing is started.

According to an embodiment the method comprises the steps of receiving the trigger from the failure detection system 24a that the malfunctioning nozzle B has started functioning again, and selecting a first print strategy again for further printing.

Figure 5:
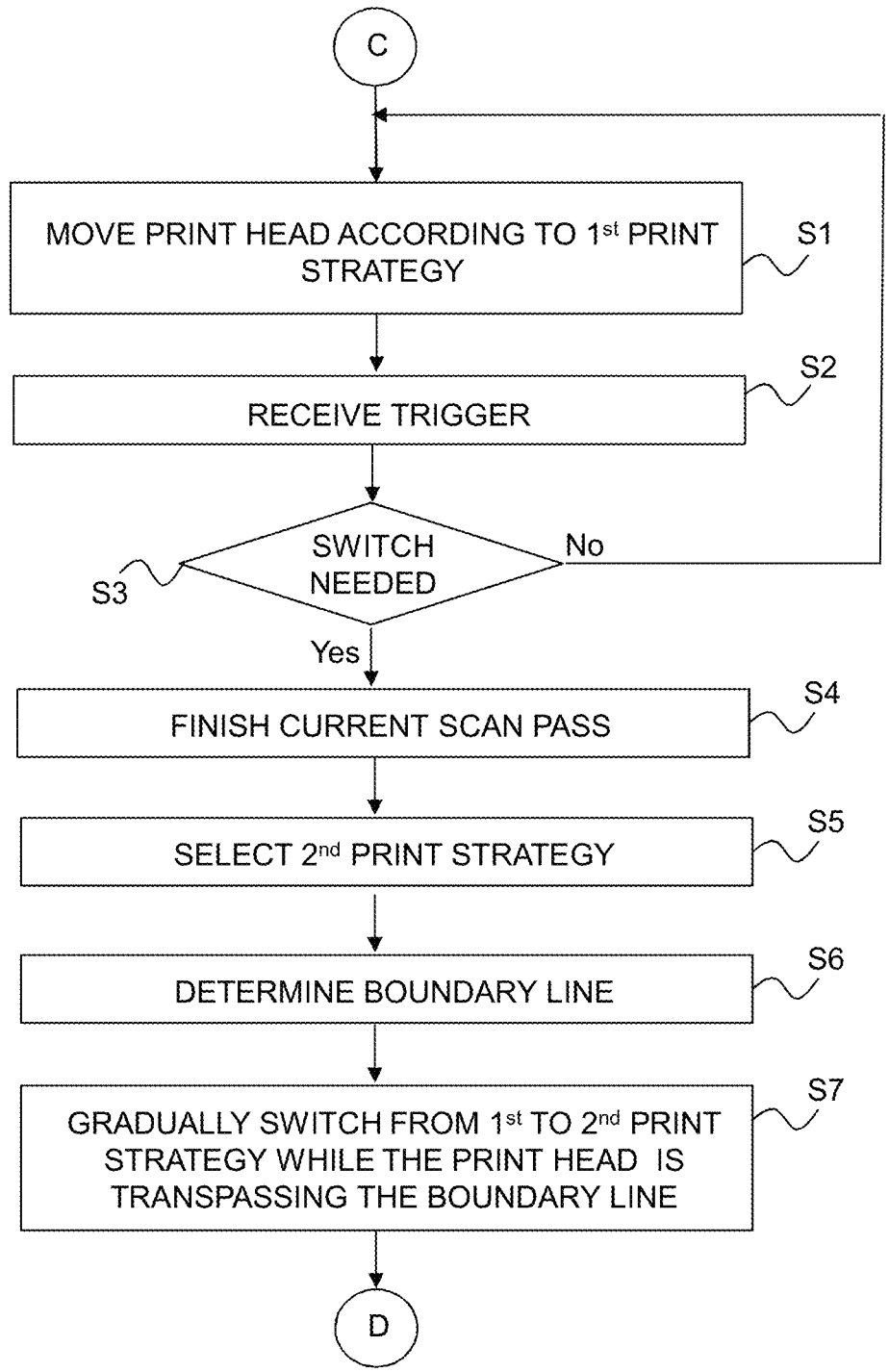
FIG. 5 is a flow diagram of the method according to the present invention.

FIG. 5 is a flow diagram of the method according to the present invention.

The method starts in a starting point C leading to a first step S1.

In the first step S1, the print head is starting to move according to the first print strategy.

In the second step S2 a trigger from the print condition detection system 24a is received by the processing unit 24 that a print condition has changed during printing.

In a third step S3 it is determined if an adaptation of the first print strategy is needed due to the changed print condition.

Upon a negative determination the method returns to the first step S1.

Upon a positive determination the method proceeds to a fourth step S4.

In the fourth step S4 the current scan pass in the main scanning direction B is finished.

In a fifth step S5 a second print strategy is selected in which the changed printing condition is taken care of, the second print strategy comprising at least one other moving distance for an advance step in the sub-scanning direction A than the first print strategy.

In a sixth step S6 a boundary line is determined on the recording medium 12 until which the first print strategy is applied and after which the second print strategy is applied. The boundary line is determined to be a line on the recording medium 12 below a print swath created by the current scan pass finished in the fourth step S4.

In a seventh step S7, in the next scan passes printing elements 22 of the print head 20 positioned above the boundary line printing according to the first print strategy and printing elements 22 of the print head 20 below the boundary line printing according to the second print strategy. A gradual switch from the first print strategy to the second print strategy is performed while the print head 20 is passing the boundary line L in the sub-scanning direction A.

The method ends in an end point D.

The invention claimed is:

1. A method of controlling a digital printer having a print head with an array of printing elements, the print head mounted on a carriage that is guided on guide rails and being arranged to scan a recording medium in a main scanning direction, and the print head and the recording medium being arranged to be moved relative to one another in a sub-scanning direction normal to the main scanning direction in predetermined steps of relatively advancing the recording medium between passes of scanning the recording medium in the main scanning direction, the printer being arranged to operate in a selected first print strategy which includes a first pattern of a constant number of scan passes per area unit of the recording medium, in the constant number of scan passes the array of printing elements moves over the recording medium in the main scanning direction resulting in print swaths on the recording medium, and a constant number of advance steps in the sub-scanning direction, wherein for each of the advance steps a moving distance is prescribed, and the printer comprises a print condition detection system arranged to detect a change of at least one print condition for printing by the digital printer, the method comprising the steps of:
 a) starting moving of the print head according to the first print strategy;
 b) during printing after each print swath, receiving a trigger from the print condition detection system that a print condition has changed during printing;
 c) determining if an adaptation of the first print strategy is needed due to the changed print condition; and
 d) upon a positive determination in the previous step c),
  d1) finishing the current scan pass in the main scanning direction;
  d2) selecting a second print strategy in which the changed printing condition is taken care of, the second print strategy comprising at least one other moving distance for an advance step in the sub-scanning direction than the first print strategy;
  d3) selecting a boundary line on the recording medium until which the first print strategy is applied and after which the second print strategy is applied, the boundary line being determined to be a line on the recording medium below a print swath created by the current scan pass finished in step d1);

d4) in next scan passes, printing elements of the print head positioned above the boundary line printing according to the first print strategy and printing elements of the print head below the boundary line printing according to the second print strategy as long as the carriage has not fully passed the boundary line; and d5) applying the second print strategy when the carriage has fully passed the boundary line.

2. The method according to claim 1, wherein the method comprises the step of adapting a distance of a step in the sub-scanning direction in order to position the print head such that a switch from the first print strategy to the second print strategy is possible.

3. The method according to claim 2, wherein the distance of the step is smaller than a largest step in the sub-scanning direction according to the second print strategy.

4. The method according to claim 1, wherein the print condition detection system is a failure detection system arranged to detect malfunctioning printing elements during printing, and the method comprises the steps of receiving the trigger from the failure detection system that a printing element has started malfunctioning during printing and that the malfunctioning printing element is aligned with another malfunctioning printing element in one of the subsequent scan passes in the main scanning direction, and step d2) comprises the sub-step of selecting the second print strategy in which the malfunctioning printing element is not aligned with the other malfunctioning printing element.

5. The method according to claim 4, wherein the method comprises the steps of receiving the trigger from the failure detection system that a malfunctioning printing element has started functioning again, and step d2) comprises the sub-step of selecting the second print strategy to be the print strategy which was in place before receiving the trigger of the malfunctioning printing element.

6. The method according to claim 1, wherein the print condition detection system comprises at least one sensor out of a temperature sensor, a pressure sensor and an air humidity sensor, and the method comprises the step of receiving the trigger from the print condition detection system that environmental conditions of the printer are changed which have an impact on the print quality of a printed end product.

7. The method according to claim 1, wherein the method comprises the step of receiving the trigger from the print condition detection system of a drift of the recording medium during printing or of a shrinkage of the recording medium.

8. The method according to claim 1, wherein the constant number of advance steps of the first print strategy as well as the second print strategy are in a single-sided direction of the sub-scanning direction.

9. A digital printer having a print head with an array of printing elements, the print head mounted on a carriage that is guided on guide rails and being arranged to scan a recording medium in a main scanning direction, and the print head and the recording medium being arranged to be moved relative to one another in a sub-scanning direction normal to the main scanning direction in predetermined steps of relatively advancing the recording medium between passes of scanning the recording medium in the main scanning direction, the printer being arranged to operate in a selected print strategy including a first pattern of a constant number of scan passes per area unit of the recording medium, in the constant number of scan passes the array of printing elements moves over the recording medium in the main scanning direction resulting in print swaths on the recording medium, and a constant number of advance steps in the sub-scanning direction, wherein for each of the advance steps a moving distance is prescribed, the digital printer further having an electronic processing unit arranged to control the movements of the print head and the recording medium as well as the operation of the printing elements, the processing system including a print condition detection system arranged to a change of at least one print condition for printing by the digital printer, wherein the processing unit is configured to control the printer in accordance with the method as claimed in claim 1.

10. The digital printer according to claim 9, wherein the print condition detection system is a failure detection system arranged to detect malfunctioning printing elements during printing, wherein the processing unit is configured to control the printer in accordance with a method comprising the steps of receiving the trigger from the failure detection system that a printing element has started malfunctioning during printing and that the malfunctioning printing element is aligned with another malfunctioning printing element in one of the subsequent scan passes in the main scanning direction, and step d2) comprises the sub-step of selecting the second print strategy in which the malfunctioning printing element is not aligned with the other malfunctioning printing element.

11. A non-transitory software product comprising program code on a machine-readable medium, wherein the program code, when loaded into an electronic processing unit of a digital printer, causes the processing unit to control the printer in accordance with the method as claimed in claim 1.

\* \* \* \* \*